US006778666B1

(12) United States Patent
Kuzmich et al.

(10) Patent No.: US 6,778,666 B1
(45) Date of Patent: Aug. 17, 2004

(54) CRYPTOGRAPHIC METHOD USING CONSTRUCTION OF ELLIPTIC CURVE CRYPTOSYSTEM

(75) Inventors: Vsevolod M. Kuzmich, St.-Petersburg (RU); Alexander G. Rostovtsev, St.-Petersburg (RU)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/267,646

(22) Filed: Mar. 15, 1999

(51) Int. Cl.[7] .............................. H04L 9/30; H01L 9/28
(52) U.S. Cl. ........................ 380/28; 380/30; 708/492
(58) Field of Search .......................... 380/28, 30, 282, 380/277, 44, 279; 713/174; 708/492, 490, 620

(56) References Cited

U.S. PATENT DOCUMENTS

| | | | | |
|---|---|---|---|---|
| 5,159,632 A | * | 10/1992 | Crandall | 380/28 |
| 5,272,755 A | * | 12/1993 | Miyagi et al. | 380/30 |
| 6,252,959 B1 | * | 6/2001 | Paar et al. | 380/28 |
| 6,446,205 B1 | * | 9/2002 | Lenstra | 713/168 |

OTHER PUBLICATIONS

Atkin and Morain, Elliptic Curves and Primality Proving, pp. 1–24, Dec. 23, 1992.*
"The Elliptic Curve Cryptoystem" by CERTICOM, Apr. 1997,pp. 1–17.*
J.M. Pollard, Mathematics of Computation, vol. 32, No. 143, Jul. 1978, pp. 918–924.
Rene Schoof, Mathematics of Computation, vol. 44, 1985, pp. 483–494.
Reynald Lercier, et al, Advances in Cryptology–EUROCRYPT 95, Springer–Verlag, Lecture notes in Computer Science, vol. 921, 1995, pp. 79–94.
Francois Morain, Advances in Cryptology–EUROCRYPT 91, Lecture notes in Computer Science, vol. 547, 1991, pp. 328–336.
Ireland and Rosen, Graduate Texts in Mathematics, Springer–Verlag, $2^{nd}$ ed., 1990, pp. 304–307.
Annex A, IEEE P1363/D7 (Draft Version 7), 1998, pp. 1–12, 53–56, 61, and 86–89.

* cited by examiner

*Primary Examiner*—Gilberto Barrón
*Assistant Examiner*—Hosuk Song
(74) *Attorney, Agent, or Firm*—Birch, Stewart, Kolasch & Birch, LLP

(57) ABSTRACT

A method for a fast and efficient construction of an elliptic curve cryptosystem is disclosed. In the present invention, a prime p of a special kind is chosen which constructs a finite field underlying the elliptic curve cryptosystem. Accordingly, the selected prime p is utilized to construct a non-singular elliptic curve of a special kind, and the elliptic curve cryptosystem parameters can be easily chosen and computed. Using such procedure, the present invention allows a fast and easy construction of a large variety of elliptic cryptosystems used in telecommunications.

21 Claims, 4 Drawing Sheets

CRYPTOGRAPHIC METHOD USING CONSTRUCTION OF ELLIPTIC CURVE CRYPTOSYSTEM

BACKGROUND OF INVENTION

1. Field of the Invention

The present invention is related to a private communication system and more particularly to providing security for a private communication using elliptic curve cryptosystem.

2. Discussion of the Related Art

Cryptographic systems are widely used as the means to provide security during exchange of information. Potentially, the cryptographic systems provide all objectives of information security such as confidentiality, integrity, authentication and availability.

There are two main classes of cryptographic systems, known as a symmetric key system and a public key system. The symmetric key systems have been used for a long time to encrypt and to decrypt messages. In the symmetric key systems, a single key can be used to encrypt and to decrypt messages. While the implementation of the symmetric key system is very efficient, the key management can be troublesome.

On the other hand, since its introduction in 1976, the public key cryptographic system has been studied and used extensively until today. The public key cryptographic systems are used for encryption and decryption, data digital signing and signature verification, and for safe exchange of a secret key through non-secure communication channels. Although public key cryptographic schemes are more convenient for key management, its implementation is currently less efficient than the symmetric key systems.

In a public key encryption scheme, the processes of encryption and decryption are separated. During encryption, a public key, often designated as 'e' is employed while a different (but mathematically related) private key 'd' is required for decryption. Knowledge of the public key allows encryption of plaintext but does not allow decryption of the ciphertext without the private key for decryption.

For example, a user selects and publishes a public key. Subsequently, others may use the selected key to encrypt messages for this user. At the same time, a private key corresponding to the public key is kept in secret by the user such that the user is the only one who can decrypt the ciphertext encrypted for the user. Well-known public key cryptographic schemes include RSA, DSA, Diffie-Hellman, ElGamal and elliptic curve cryptosystems (ECC).

A comparison of the public key cryptographic systems shows that the elliptic curve cryptosystems offer the highest strength-per-key-bit among any known systems. With a 162-bit modulus, an elliptic curve system offers the same level of cryptographic security as DSA or RSA having a 1024-bit moduli. Smaller key sizes gives the elliptic curve cryptosystem advantages, including smaller system parameters, smaller public key certificates, bandwidth savings, faster computations, and lower power requirements.

Many cryptosystems require arithmetic to be performed in mathematical structures called a group and a field. A group is a set of elements with a custom-defined arithmetic operation over the elements, while a field is a set of elements with two custom-defined arithmetic operations over its elements. The order of a group is the number of its elements. The arithmetic operations defined in groups and fields requires certain properties, but the properties of a field are more stringent than the properties of a group.

The elliptic curve is an additive group with a basic operation of addition. Elliptic curves as algebraic and geometric entities have been studied extensively for the past 150 years, and from these studies a rich and deep theory had emerged. As a result, the elliptic curve systems as applied to cryptography were proposed in 1985.

Elements of an elliptic curve are pairs of numbers (x, y), called points. The x and y values may be ordinary (real) numbers, or they may be members of a field in which the elliptic curve is defined. Such fields are called the underlying field of the elliptic curve. The choice of the underlying field affects the number of points in the elliptic curve, the speed of elliptic curve computations, and the difficulty of the corresponding discrete logarithm problem. Thus, when elliptic curves are used for cryptosystems, the underlying field affects the key sizes, the computational requirements and the security. Choosing different underlying fields allows an extensive variety of elliptic curves.

Usually two classes of elliptic curve cryptosystems are used, one of which is defined over the underlying field Fp (i.e. modulo prime p) and the other defined over the underlying field $F_2^m$ (modulo irreducible polynomial of power $2^m$). The second class of elliptic curve cryptosystems is characterize by considerably less number of suitable curves and has lower performance, except for performance in hardware implementation. Thus, elliptic curve cryptosystem over the underlying field Fp receives more interest. Below, we consider Fp as the underlying field, where p is a prime of a special kind, and an elliptic curve over Fp, defined by equation $y^2 = x^3 + Ax + B$ (mod p), where A, B∈Fp. The essential requirement for such elliptic curves is a non-zero curve discriminant, $4A^3 + 27B^2 \neq 0$ (mod p).

The elliptic curve element is an elliptic curve point designated as P(x, y)∈E(Fp). Thus, point P lies on the elliptic curve E defined over underlying field Fp and the point coordinates x, y∈Fp. The order of elliptic curve is the number of points on the elliptic curve. The group operation for an elliptic curve is addition of two elements, i.e. the points. Thus, the basic operation on an elliptic curve is the addition of elliptic curve points. The addition of elliptic curve points results in another point lying on the same elliptic curve. Adding two different points, such as P+Q=$R_1$, is called the addition of two distinguished points. If the same two points are added, i.e. the point is added to itself, such as P+P=2P=$R_2$, the operation is called the doubling of points. A repeated addition of a point with itself is called a scalar multiplication of the point by an integer k: P+P+P+ . . . + P=kP=$R_3$ where k is an integer. The original points and the resulting points all lie on the same elliptic curve: P, Q, $R_1$, $R_2$, $R_3$∈E(Fp).

An order of an elliptic curve point is significant in elliptic curve cryptosystems. The order of elliptic curve point P is the least integer n such that scalar multiplication of point by this number produces a special point on an elliptic curve, called the infinity point O (nP=O). The infinity point is an identity of the elliptic curve as a group.

For the underlying field Fp, if the order of elliptic curve is composite, then the elliptic curve group can be separated into subgroups, and each of the subgroup will have a prime order, i.e. consist of prime number of points. In such case, the order of each subgroup is smaller than the order of elliptic curve. In the subgroup, all points have the same order, which is equal to the order of the subgroup. Group operations over points of one subgroup produce points of the same subgroup again. For example, repeated addition of an arbitrary point of a subgroup with itself produces all the points of the subgroup. By repeating the addition for the number of times equal to the order of the subgroup, the infinity point is produced. The next addition produces the initial point. If the order of an elliptic curve is a prime, the curve cannot be separated into subgroups, and the order of any point would be equal to the order of the elliptic curve.

The following is a list of terms and definitions which will be referred to describe the background art and the present invention.

p: a prime integer;

GF(p): a finite field with p elements, a complete residue system modulo p;

Fp: a brief notation of GF(p);

E: an elliptic curve, defined over Fp by equation $y^2=x^3+Ax+B$ (mod p);

E(Fp): a group of elements called elliptic curve points, defined over Fp;

E(Fp): an order of elliptic curve and also a number of points on a curve;

N: another designation of a number of points on an elliptic curve;

n: an order of arbitrary point on elliptic curve, in general case being equal to N;

q: a maximal prime divisor of N, or the prime order of an elliptic curve;

A, B: an arbitrary positive integers, $0 \leq A$, $B \leq p-1$, representing the curve equation coefficients;

Q(x, y): a point on an elliptic curve E(Fp), which satisfy the equation $$y^2=x^3+Ax+B \text{ (mod p)};$$

$Q(x_0, y_0)$: an initial point of an elliptic curve having the order q called group generator;

O: a special point on an elliptic curve E(Fp), called the infinity point;

x, y: x and y coordinates of a point, and arbitrary elements of Fp;

D: complex multiplication (CM) discriminant of E(Fp).

The basis for the security of elliptic curve cryptosystems is the apparent intractability of the elliptic curve discrete logarithm problem (ECDLP) as described below.

Let $P \in E(Fp)$ be a point of order n, and let $R \in E(Fp)$ be another point of E(Fp). Assuming n is known, the elliptic curve logarithm problem is the following: given P and R, determine the unique integer k, $0 \leq k \leq n-1$, such that R=kP, provided that such integer exists.

The best algorithm known for solving an elliptic curve discrete logarithm problem is the Pollard rho-method, shown in "Monte Carlo methods for index computations mod p", by J. Pollard, Math. Comp., v. 32, pp. 918–24 (1978). The Pollard rho-method is applicable to any finite group and is an exponential square root attack. Thus, the method has a running time proportional to the square root of the largest prime factor dividing the order of group. Particularly, the method takes approximately $\sqrt{(\pi n/2)}$ steps, where a step is an elliptic curve addition. Also, the Pollard rho-method can be parallelized such that if r processors are used, the expected number of steps necessary by each processor before a single discrete logarithm can be obtained is $(\sqrt{(\pi n/2)})/r$. Consequently, this root attack may be avoided if an elliptic curve is chosen so that its order is a large prime, or is divisible by a large prime. Currently, the recommended order is 162 bits or higher (for this case, the elliptic curve cryptosystem has a strength roughly equal to 1024-bit RSA).

Hasse's theorem states that the number of points on an elliptic curve is $$\#E(Fp)=p+1\pm t \tag{1}$$

where $|t| \leq \sqrt{p}$. The exact value depends on prime p and the elliptic curve equation coefficients A and B. In other words, the order of an elliptic curve #E(Fp) is roughly equal to the size p of the underlying field. R. Schoof discloses a polynomial-time algorithm in "Elliptic curves over finite fields and the computation of square roots mod p," Mathematics of Computation, v. 44, pp. 483–94 (1985) and R. Lercier and F. Morain discloses an improved algorithm in "Counting the number of points on elliptic curves over finite fields: strategies and performances," Advances in Cryptology—EUROCRYPT '95, Lecture Notes in Computer Science, v. 921, pp. 79–94 (1995) for counting the number of points on an elliptic curve.

However, the existing processes and point counting methods, suggested by R. Schoof, R. Lercier and F. Morain, are impractical because of their complexity. Using the current desktop computers may take several days or even weeks for the calculation. A special class of elliptic curves called supersingular exist for which the number of points can be easily computed. However, these supersingular elliptic curves turned out to be disastrous because their discrete logarithm problem can be reduced to a discrete logarithm problem over extensions of underlying field of small degree. See. "Elliptic Curve Public Key Cryptosystems" by A. Menezes, Kluwer Academic Publishers, pp. 72–7 (1993). Accordingly, only non-supersingular elliptic curves are used for cryptographic systems.

There are three general approaches to select an elliptic curve for elliptic curve cryptosystems. The three approaches may be summarized as below.

(1) Select a curve at random, compute its order directly, and repeat the process until an appropriate order is found.

(2) Select curve coefficients with particular desired properties, compute the curve order directly, and repeat the process until an appropriate order is found.

(3) Search for an appropriate order, and construct a curve of that order.

The first is a classical approach, but is impractical because it suggests the use of Schoofs or Morain's point counting algorithm. The second approach depends on the particular desired properties of the cryptosystem. The third approach can be implemented using the complex multiplication (or CM) method. Over GF (p), the CM technique is also called the Atkin-Morain method, described by F. Morain in "Building cyclic elliptic curves modulo large primes," Advances in Cryptology—EUROCRYPT '91, Lecture Notes in Computer Science, v. 547, pp. 328–36 (1991).

The complex multiplication technique is as follows. If E is a non-supersingular elliptic curve over GF (p) with order n, then $Z=4p-(p+1-n)^2$ where Z is positive by the Hasse bound, see equation (1). Also, there is a unique factorization, $Z=DV^2$ where D is squarefree (i.e. contains no square factors). Accordingly, letting $(p+1-n)^2=W^2$, $DV^2=4p-W^2$. Thus, for each non-supersingular elliptic curve over GF (p) of order n, there exists a unique squarefree positive integer D such that $$4p=W^2+DV^2, \tag{2}$$

$$n=p+1\pm W \tag{3}$$

for some W and V.

The non-supersingular elliptic curve E has complex multiplication by D (or, more properly, by $\sqrt{-D}$ where D is a CM discriminant for p and n. Equation (3), however is for the general case when D>3; therefore, $$n=p+1\pm W \text{ or } n=p+1\pm V, \text{ for } D=1 \quad (3.1)$$

$$n=p+1\pm W \text{ or } n=p+1\pm(W\pm 3V)/2, \text{ for } D=3. \quad (3.2)$$

As a result, four or six different number of points are possible for D=1 and D=3, respectively.

If D is known for a given curve E, its order may be computed via equations (2) and (3). The curve E can be constructed with CM by small D. Therefore one can obtain curves whose orders n satisfy equations (2) and (3.1), and equations (2) and (3.2) for small D.

Special procedure suggests for testing whether a square-free positive integer D is a CM discriminant for p, and then for producing values W and V satisfying equation (2) to compute the elliptic curve of order n by equation (3). This procedure is recursive and uses the matrix operations. Particularly, the procedure for constructing the elliptic curve with the prescribed CM discriminant D suggests computing reduced symmetric matrices of D, and then computing the reduced class polynomial for D. These algorithms are not time consuming, but are difficult to implement, for any values of D.

Generally, a construction of an elliptic curve cryptosystem includes choosing and computing of its parameters. The set of elliptic curve cryptosystem parameters consists of large prime p, which is a characteristic of the underlying field Fp; elliptic curve coefficients A and B; number of point N and it's prime divisor q; and initial point Q(x, yo) of order q, called a group generator. The parameters of elliptic curve cryptosystem must satisfy some requirements to provide appropriate security level. These requirements are as follows.

(R1) Elliptic curve must have a non-zero discriminant: $4A^3+27B^2 \neq 0 \pmod{p}$.

(R2) Number of points N must have large prime divisor q, or be prime (q=N).

(R3) Number of points N must be relatively prime to prime p.

(R4) The order q must not divide any number from the set $\{p-1, p^2-1, \ldots, p^k-1\}$, where $k \approx \log_2(p)/8$. This is also called the MOV-condition.

(R5) The group generator $Q(x_0, y_0)$ must have an order q.

Figure 1:
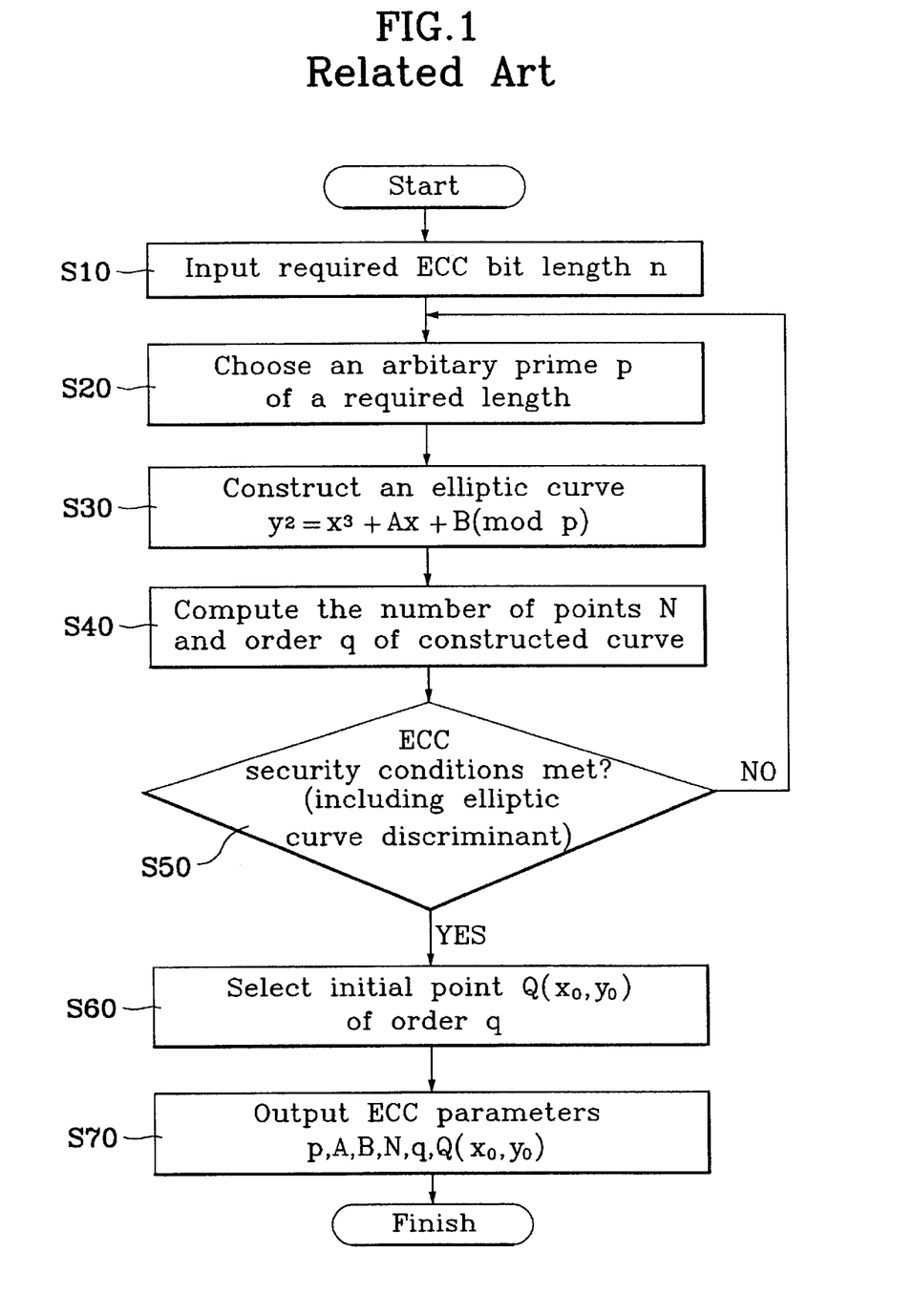
FIG. 1 is flowchart for a method of elliptic curve cryptosystems construction in the related art.

A general process for constructing an elliptic curve cryptosystem is shown in FIG. 1 and comprises the steps of inputting the required ECC bit length n (step S10); generating or choosing a prime p having the required length and constructing the underlying field Fp (step S20); constructing the elliptic curve by choosing equation coefficients A and B for a non-zero discriminant (step S30); computing the number of points N on elliptic curve and its prime divisor q (step S40); checking whether the conditions in requirements (R2)–(R4) are satisfied (step S50); choosing the arbitrary point of elliptic curve as an initial group generator $Q(x_0, y_0)$ to have order q (step S60); and outputting the ECC parameters (step S70).

However, as discussed above, the available algorithms in the related art to compute the parameters are either time consuming or difficult to implement Therefore, while an elliptic curve cryptosystem may provide information security in communication, a problem of choosing the set of elliptic curve cryptosystem parameters exists.

OBJECTIVES OF THE INVENTION

An object of the present invention is to solve at least the problems and disadvantages of the related art.

An object of the present invention is to provide a process and method for fast construction of an elliptic curve cryptosystem utilized in telecommunication systems.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

The present invention provides according to an embodiment a construction process of a special kind of finite field characteristic p and special types of non-supersingular elliptic curves, where CM discriminant is prescribed. According to the present invention, the number of points and the prime order of elliptic curve are defined by simple equations and can be easily computed. The point counting algorithm has a deterministic character, including a few equations and linear arithmetic operations, namely addition and multiplication.

Also, the present invention provides according to an embodiment a high speed of elliptic curves construction algorithm, including the determining of complete set of cryptosystem parameters, in a few seconds. Moreover, the construction algorithm is flexible such that a new set of cryptosystem parameters can be computed either completely or partially, depending on the actual needs of the telecommunication system. Furthermore, the algorithm does not limit a number of different elliptic curve cryptosystem which can be generated for use in the communication system. Thus, the proposed invention provides a large variety of elliptic curve cryptosystems, which can be easily constructed.

BRIEF DESCRIPTION OF THE RRAWING

The invention will be described in detail with reference to the following drawings in which like reference numerals refer to like elements wherein.

DETAILED DESCRIPTION OF THE PREFERRED EMBODIMENTS

The elliptic curve parameters should be chosen so that the resulting cryptosystem will have an appropriate strength. Because the elliptic curve cryptosystem strength is defined by its order, an important step of cryptosystem constructing process is computing the number of points N on the elliptic curve, and its prime divisor q. These numbers depends on values of prime p and elliptic curve coefficients A, B. The number of points on an elliptic curve is fixed after setting an underlying field and the elliptic curve equation.

The elliptic curve cryptosystem according to the present invention utilizes a special kind of field characteristic p and a special kind of elliptic curve equation, having particular desired properties and providing the fixed value for the CM discriminant D, namely D=1 or D=3. This limits the number of elliptic curve points to only a few possible values, thereby allowing the elliptic curve order to be easily computed. The process is repeated until an appropriate order is found.

Figure 2:
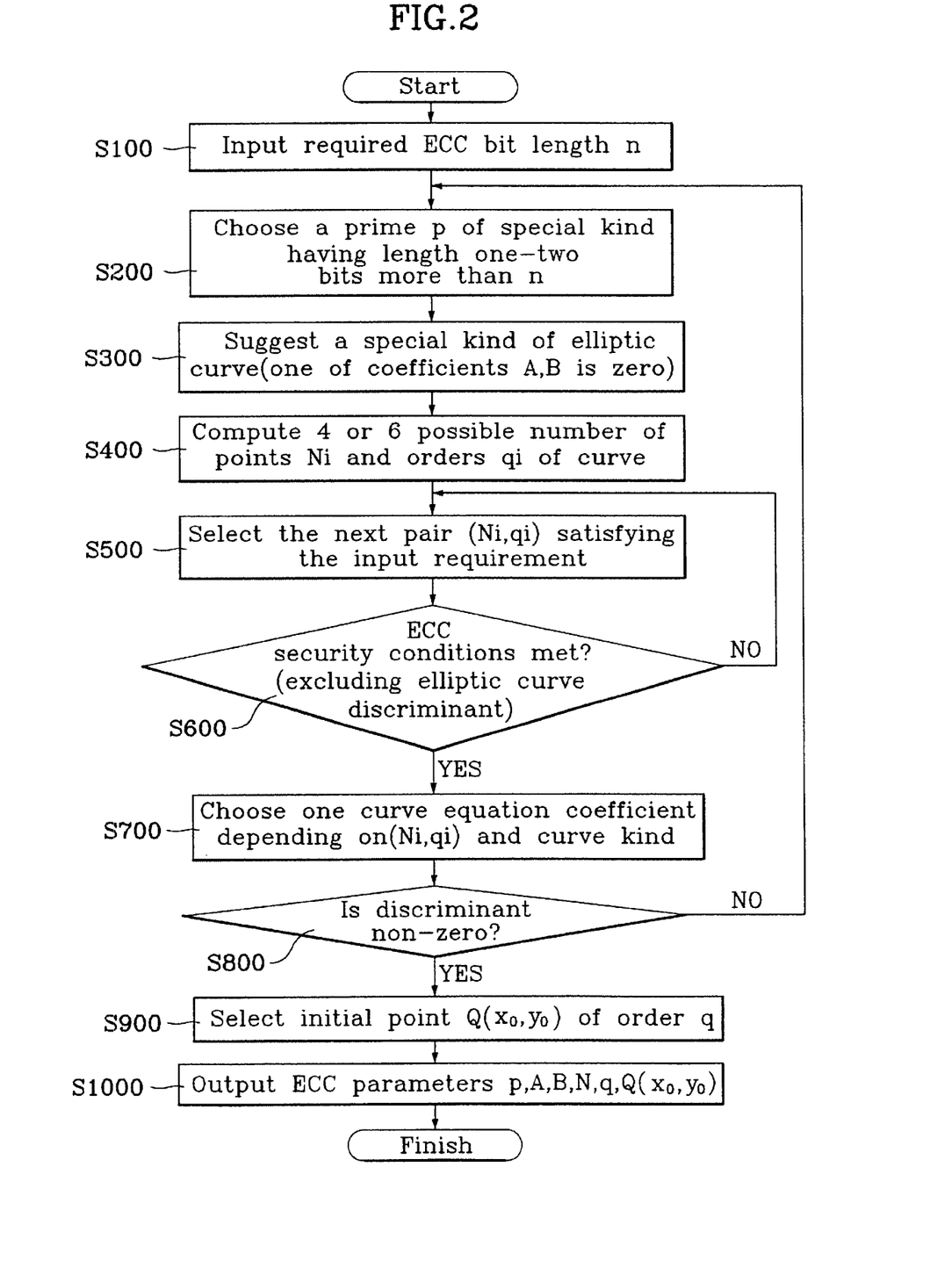
FIG. 2 is flowchart for a general method of constructing elliptic curve cryptosystems according to an embodiment of the present invention.

FIG. 2 shows a process for constructing an elliptic curve cryptosystem according to the present invention, comprising the steps of inputting the required ECC bit length n (step S100); generating or choosing a prime p having a special characteristic and a length of one or two bits higher than the required order, and constructing the underlying field Fp (step S200), wherein the field characteristic p provides a small value of CM discriminant D; suggesting a special kind of elliptic curve equation with a few possible numbers of points on curve (step S300); computing all possible variants for the number of points $N_i$ on elliptic curve and its' prime divisors $q_i$ (prime group order) according to D (step S400); selecting a pair ($N_i$, $q_i$) which corresponds to where the prime order of elliptic curve is at a maximum (step S500) and which satisfies the requirements (R2–R4) (step S600); choosing the elliptic curve equation coefficients A and B which correspond to the fixed underlying field, results in an elliptic curve with a number of points and an order equal to the selected values (step S700), and has a non-zero discriminant (step S800); choosing an arbitrary point of the elliptic curve as an initial group generator $Q(x_0, y_0)$ such that its order is equal to q (step S900); and outputting the ECC parameters (step S1000).

As discussed above, a set of elliptic curve cryptosystem parameters includes large prime p, which is a characteristic of the underlying field Fp; elliptic curve coefficients A and B; number of point N and it's prime divisor q; and initial point $Q(x_0, y_0)$ of order q, called a group generator. An explanation of choosing the appropriate kind of p and elliptic curve equation to provide limited cases for possible numbers of points on the curve will next be made with reference to the requirement and congruence conditions for the CM discriminant value.

Let $|q_{min}|$ be a lower bound for group generator order, and let a squarefree positive integer D be a CM discriminant for p which satisfies the congruence conditions:

$$K=[(\sqrt{p}+2)^2/|q_{min}|] \text{ where}$$

if p≡3 (mod 8), then D≡2, 3, or 7 (mod 8);
if p≡5 (mod 8), then D is odd;
if p≡7 (mod 8), then D≡3, 6, or 7 (mod 8);
if K=1, then D≡3 (mod 8); and
if K=2 or 3, then D≢7 (mod 8).

The possible values of the squarefree CM discriminant D, which corresponds to the congruence conditions are shown in Table 1 below.

TABLE 1

Possible values of squarefree CM discriminant D for prime p.

| p value | K value | Possible D values for p and K values |
|---|---|---|
| | K = 1 | D = 3, 11, 19, 35, 43, 51, 59, 67, 83, 91, . . . |
| p ≡ 1 (mod 8) | K = 2 or 3 | D = 1, 2, 3, 5, 6, 10, 11, 13, 14, 17, 19, 21, . . . |
| p ≡ 1 (mod 8) | K ≧ 4 | D = 1, 2, 3, 5, 6, 7, 10, 11, 13, 14, 15, 17, . . . |
| p ≡ 3 (mod 8) | K = 2 or 3 | D = 2, 3, 10, 11, 19, 26, 34, 35, 42, 43, 51, . . . |
| p ≡ 3 (mod 8) | K ≧ 4 | D = 2, 3, 7, 10, 11, 15, 19, 23, 26, 31, 34, . . . |
| p ≡ 5 (mod 8) | K = 2 or 3 | D = 1, 3, 5, 11, 13, 17, 19, 21, 29, 33, 35, . . . |
| p ≡ 5 (mod 8) | K ≧ 4 | D = 1, 3, 5, 7, 11, 13, 15, 17, 19, 21, 23, . . . |
| p ≡ 7 (mod 8) | K = 2 or 3 | D = 3, 6, 11, 14, 19, 22, 30, 35, 38, 43, 46, . . . |
| p ≡ 7 (mod 8) | K ≧ 4 | D = 3, 6, 7, 11, 14, 15, 19, 22, 23, 30, 31, . . . |

Thus, the CM discriminant value of 1 would be possible for p≡1 (mod 8) and p≡5 (mod 8). The two p identities can be united to a new identity p≡1 (mod 4). On the other hand, the CM discriminant value of 3 would be possible for all kinds of p. These conclusions will be used below with the following theorem.

Theorem 1. If squarefree integer −D, (0<D<p), is a quadratic residue modulo prime p, where p>2, then p has factorization in ring $Z[\sqrt{-D}]$:

$$p=(a+b\sqrt{-D})(a-\sqrt{-D})=a^2+Db^2, \text{ where } a,b \in Z. \quad (4)$$

Proof. Since −D is a quadratic residue, there exists integers s, t, 0<(s,t)<p, such that the equality $t^2 \equiv -D$ (mod p) holds in Z. Accordingly, $t^2+D \equiv 0$ (mod p), or $t^2+D=$ ps. Thus, $(t+\sqrt{-D})(t-\sqrt{-D})=ps$ Assuming p is a prime element in ring $Z[\sqrt{-D}]$, p must divide $(t+\sqrt{-D})$ or $(t-\sqrt{-D})$, i.e. p must divide t: p|t. However, this is not possible and the assumption that p is a prime element in $Z[\sqrt{-D}]$ is wrong. The only possible factorization integer p in $Z[\sqrt{-D}]$ is complement factors:

$$p=(a+b\sqrt{-D})(a-b\sqrt{-D})=a^2+Db^2.$$

Corollary 1 If p is prime of kind p≡1 (mod 4), then for some a, b∈Z, $$p=a^2+b^2 \quad (5)$$

Proof. According to quadratic reciprocity low, −1 is quadratic residue modulo p and letting D=1, Theorem 1 gives the result.

Corollary 2. If p is prime of kind p≡1 (mod 6), then for some a, b∈Z, a≠0 (mod 3), $$p=a^2+3b^2 \quad (6)$$

Proof. According to quadratic reciprocity low, two cases exist depending upon p modulo 4 congruence (or more particularly, modulo 12, because p≡1 (mod 6)):

$$(-3/p) = \begin{cases} (p/-3) = (p/3) = 1, & \text{if } p \equiv 1 (\text{mod } 12) \\ -(p/-3) = (p/3) = 1, & \text{if } p \equiv 7 (\text{mod } 12) \end{cases}$$

Thus, −3 is the quadratic residue modulo p and letting D=3, Theorem 1 gives the result.

Moreover, there are two other important theorems, proved in by Ireland and Rosen in "A classical Introduction to Modern Number Theory," Springer-Verlag, $2^{nd}$ ed., pp. 304–7 (1990), fully incorporated herein. The first of which is that over underlying field Fp, where p≡1 (mod 4), the elliptic curve of kind $y^2=x^3+Ax$ has the number of points $$N = p + 1 + \overline{\left(\frac{A}{\pi}\right)_4} \pi + \left(\frac{A}{\pi}\right)_4 \overline{\pi} \qquad (7)$$

where $p=\pi\overline{\pi}$ is the factorization of a number p in the ring Z[i], $i^2=-1$, and designation $(*)_4$ is the fourth-degree residue symbol (i.e. homomorphism from Z[i] to multiplicative group $G_4=\{-i, -1, i, 1\}$ of roots degree 4 of 1).

The number of points depends on the residue degree four of coefficient A. There are 4 possible residues, which correspond to four possible numbers of points. Using Corollary 1, and by substituting $$p=a^2+b^2=(a+bi)(a-bi)$$

and group $G_4$ to equation (7), N can take 4 different values:

$$N=p+1\pm 2a \text{ or } N=p+1\pm 2b. \qquad (7.1)$$

The second theorem states that over underlying field Fp, where p=1 (mod 6), the elliptic curve of kind $y^2=x^3+B$ has the number of points $$N = p + 1 + \overline{\left(\frac{4B}{\pi}\right)_6} \pi + \left(\frac{4B}{\pi}\right)_6 \overline{\pi} \qquad (8)$$

where $p=\pi\overline{\pi}$ is the factorization of a number p in the ring Z[ω], ω=exp(2πi/3), $i^2=-1$, and designation $(*)_6$ is the sixth-degree residue symbol (i.e. homomorphism from Z[ω] to multiplicative group $G_4=\{-\omega, \omega^2, -1, \omega, -\omega^2, 1\}$ of roots degree 6 of 1).

The number of points depends on the residue degree six of coefficient B. There are 6 possible residues, which correspond to 6 possible numbers of points. By substituting $$p=c^2-cd+c^2=(c+d\omega))(c+d\omega^2)$$

and group $G_6$ to equation (8), N can take 6 different values of $p+1+\{c+d, -c-d, 2c-d, -2c+d, -c+2d, c-2d\}$. The ring Z[ω] has 6 invertible elements, namely the group G, such that a factorization of p given above would not be unique. For example, multiplying the first factor by ω and the second by $\omega^2$ results in another factorization. However, using a ring Z[√-3], a unique factorization results, since only 1 and -1 are the invertible elements:

$$p=a^2+3b^2=(a+b\sqrt{-3})(a-b\sqrt{-3}).$$

This confirms Corollary 2 and 6 values of N results, as will be shown in equation 8.1 below. These values are the same as obtained through a and b. Different factorizations one-to-one correspondence is provided by substitution a=c−d/2, and b=d/2.

$$N=p+1\pm 2a, \text{ or } N=p+1\pm(a\pm 3b). \qquad (8.1)$$

The case with four orders corresponds to the CM discriminant D equaling 1 with possible orders are p+1±W and p+1±V. The case with six orders corresponds to the CM discriminant D equaling 3 with possible orders p+1±W and p+1±(W±3V)/2.

Following the CM discriminant technique to compute (all possible) elliptic curve order(s), the values V, W and D are required. However, the proposed point counting technique according to the present invention does not require the three values because the equations (7.1) and (8.1) may be used. Namely, a correspondence exists between equation (2) and Theorem 1 proved above. Letting W=2a and V=2b, the equation (2) is identical to equation (5) and (6); and equations (3.1) and (3.2) are identical to (7.1) and (8.1) respectively.

Thus, p=1 (mod 4) always for CM discriminant D=1, and p=1 (mod 6) always for CM discriminant D=3. Conversely, for p=1 (mod 4), a CM discriminant value D=1 would be possible. Similarly, for p=1 (mod 6), a CM discriminant value D=3 would be possible. Accordingly, the possible variants of the point numbers can be easily computed by choosing the special kind of prime p. Moreover, the calculation of the point numbers according to the present invention corresponds to the CM discriminant technique, but does not require the values of V and W.

Consequently, for p of a kind where p=1 (mod 4), $p=a^2+b^2$ and by choosing an elliptic curve as $y^2=x^3+Ax$ (mod p), where A≠0, four possible cases of curve orders may be computed using equation (7.1). Likewise, for p of a kind where p=1 (mod 6), $p=a^2+3b^2$, and by choosing an elliptic curve as $y^2=x^3+B$ (mod p), where B≠6 0, six possible cases of curve orders may be computed using equation (8.1). The present invention proposes choosing the set of elliptic curve parameters and generating the cryptosystem using one of these two suitable combinations of kind of field characteristic p and kind of non-supersingular elliptic curve equation, for which the number of elliptic curve points can be easily computed.

The first combination uses an elliptic curve, defined by the equation with coefficient B=0, and underlying field with prime characteristic p of special kind, equal to 4m+1 for some integer m. Such elliptic curve has only four possible number of points, where the points depend upon the elliptic curve equation coefficient A≠0. The second combination uses an elliptic curve, defined by the equation with coefficient A=0, and underlying field with prime characteristic p of special kind, equal to 6m+1 for some integer m. Such elliptic curve has only six possible number of points, where the points depend upon the elliptic curve equation coefficient B.

The process for constructing an elliptic curve cryptosystem using the specified types of curve and underlying fields is described below. In general, the process includes the procedures of:

(1) Generating the random numbers of desired length;
(2) Testing whether an integer is a prime;
(3) Integer and modular addition, subtraction and multiplication;
(4) Computing the square root modulo prime;
(5) Point addition on elliptic curves; and
(6) Scalar multiplication of a point by an integer.

The procedures (1)–(6) above may use any modular and elliptic points arithmetic algorithms such as disclosed in *Standard Specifications for Public Key Cryptography*, Annex A, "Number-Theoretic Background," IEEE P1363/D7 (Draft Version 7), pp.5–10, 12, 53–56, 61 and 86–89 (1998), fully incorporated herein by reference.

Figure 3:
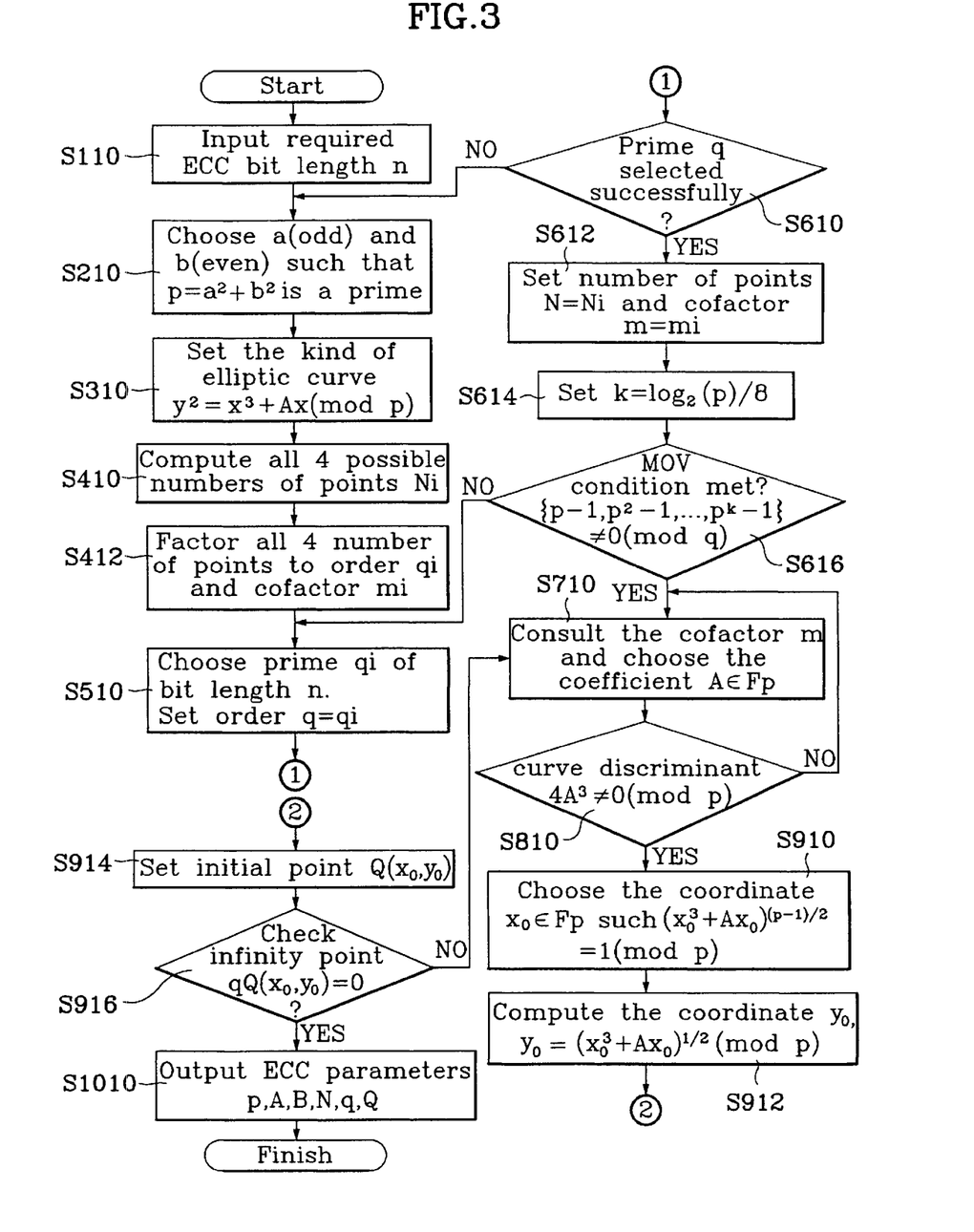
FIG. 3 is a flowchart for constructing elliptic curve cryptosystems according to an embodiment of the present invention when CM discriminant value is 1.

The process for generating an elliptic curve cryptosystem using the first type of elliptic curve, $y^2=x^3+Ax$ (mod p), where p=1 (mod 4), will be explained with reference to FIG. 3. First, a prime p having a length of one or two bits higher than the required order is chosen (step S110) such that p=1 (mod 4), and the decomposition of $p=a^2+b^2$, where a is odd and b is even, is found (step S210). For p=1 (mod 4), a decomposition always exists, as shown in Theorem 1 and Corollary 1. Alternatively in step S210, p may be reconstructed by choosing a pair of random integers a, b, where a is odd and b is even, such that the integer $p=a^2+b^2$ is a prime of the required length (here, the condition p=1 (mod 4) always holds).

Next, the kind of elliptic curve equation: $y^2=x^3+Ax$ (mod p) is determined with a CM discriminant value of 1 (step S310). There are four possible number of points on such curve: $N_i=\{p+1\pm 2a, p+1\pm 2b\}$. The actual number of points depends upon coefficient A. The four possible number of points are computed (step S410), resulting in the following variants:

$N_1=p+1+2a;$ $N_2=p+1-2a;$ $N_3=p+1+2b;$ $N_4=p+1-2b.$

Thereafter, the prime divisors $q_i$ for all four computed variants are computed by $N_i=m_i\cdot q_i$, where the possible values of m are 2 or 4 (step S412).

$N_1=m_1\cdot q_1;$ $N_2=m_2\cdot q_2;$ $N_3=m_3\cdot q_3;$ $N_4=m_4\cdot q_4.$

The variant of a prime divisor q, having the required order and the corresponding number of points N, is chosen (step S510). In general, q is a few bits shorter than p. By choosing the initial p one or two bits longer than the order required, the possibility to select q of the exact length required is provided. The MOV conditions and the relative primality of N and p are checked for the selected N and p (steps S610–S616). If q has not been appropriately selected or if there are no suitable q and N, the process returns to step S510. Also, if any one of the other conditions does not hold, the process returns to step S510 and another q and N are chosen.

If all conditions are satisfied, a coefficient A is chosen (step S710) such that:

(i) if N=0 (mod 4) and if order cofactor m is equal to 4, A should be the quadratic residue satisfying the modular equation $A^{(p-1)/2}=1$ (mod p); otherwise if N=0 (mod 2) and if order cofactor m is equal to 2, A should be the quadratic non-residue satisfying the equation $A^{(p-1)/2}=-1$ (mod p); and (ii) for chosen A and B=0, a check is made whether the elliptic curve has a non-zero discriminant (step S810): $4\cdot A^3+27\cdot B^2\neq 0$ (mod p).

The elliptic curve constructed by steps S210 to S710 should have a non-zero discriminant, unless a computation error has been made. If the discriminant is not equal to zero, the process returns to step S710. The initial point $Q(x_0, y_0)$, satisfying the elliptic curve equation is chosen (steps S910 to S914), checking that being multiplied by order q produces an infinity point: $q\cdot Q=O$ (step S916). If such condition does not hold, the process also returns to step S710 and choose another coefficient A.

Alternatively, an xO coordinate may be chosen, checking the condition $(x_0^3+A\ x_0)^{(p-1)/2}=1$ (mod p) and if such condition holds, the $y_0$ coordinate of an initial point may be computed by solving the elliptic curve equation. If $y_0$ does not satisfy the condition, the process returns to step S710 and another equation coefficient A is chosen. At this point, the Elliptic curve cryptosystem has been generated and the new elliptic curve cryptosystem parameters: p, A, B, N, q, Q are output (S1010). An example will be given to illustrate the process of generating an elliptic curve cryptosystem.

EXAMPLE 1

Let p=41. A factorization of p produces a=5 and b=4, since $5^2+4^2=41$.

The possible numbers of points and corresponding orders of subgroups are:

$N_1=p+1+2a=52=4\cdot 13;$ (a prime)

$N_2=p+1-2a=32=4\cdot 8;$ (not a prime and not considered later)

$N_3=p+1+2b=50=2\cdot 25;$ (not a prime and not considered later)

$N_4=p+1-2b=34=2\cdot 17;$ (a prime as well as maximal).

Accordingly, as a first approximation, the best choice would be to designate N=34, q=17 and cofactor m=2. Checking the security conditions, N and p are relatively prime; N≠p+1; and the MOV condition (p−1=40→6≠0 (mod q) and $p^2-1=1681\to 15\neq 0$ (mod q); for this short p, it is enough) also holds. Thus, the selected parameters may be used to generate a curve.

To choose the required curve coefficient A, the value of m must be considered. Since m is equal to 2, A should be a quadratic non-residue modulo p where $A^{(p-1)/2}=-1$ (mod p). First, a value is tried for A, for example A=2. Computing $A^{20}=1048576\to 1$ (mod p), A is not a quadratic non-residue modulo p. Setting the next value, A=3 and $A^{20}=43046721\to 40\to -1$ (mod p). Thus, the coefficient A is selected to have a value 3. Next, the elliptic curve discriminant is checked for A=3, where $4A^3=108\to 26\neq 0$ (mod p). Thus, the elliptic curve equation is $y^2=x^3+3x$ (mod p).

To choose the initial point $Q(x_0, y_0)$ on the curve, $x_0$ will first be chosen and determined whether it makes the right side of the curve equation into a quadratic residue. Trying $x_0=2$, $(x_0^3+A\ x_0)^{(p-1)/2}=14^{20}\to -1$ (mod p) and the equation is unsolvable. Letting $x_0=1$, $(x_0^3+Ax_0)^{(p-1)/2}=420\to 1$ (mod p) and the equation is solvable, producing $y_0=2$. Hence, a group generator $Q(x_0, y_0)=Q(1, 2)$. Checking the point order, the scalar multiplication $q\cdot Q$ should produce an infinity point, while $m\cdot Q$ should not. 17Q=O and 2Q=R(31, 35)≠O. Thus, all the parameters were computed properly and the selected point is a group generator. The parameters p=41, A=3, B=0, N=34, q=17, $Q(x_0, y_0)=Q(1, 2)$ are output.

Note that the above example is for illustrative purposes only. To provide the proper security level, a q length of hundreds bits is often required depending upon the practical system application. Because of a close correlation between p and q length, p should be chosen (or constructed) such that it will have a length of hundreds bits too.

Figure 4:
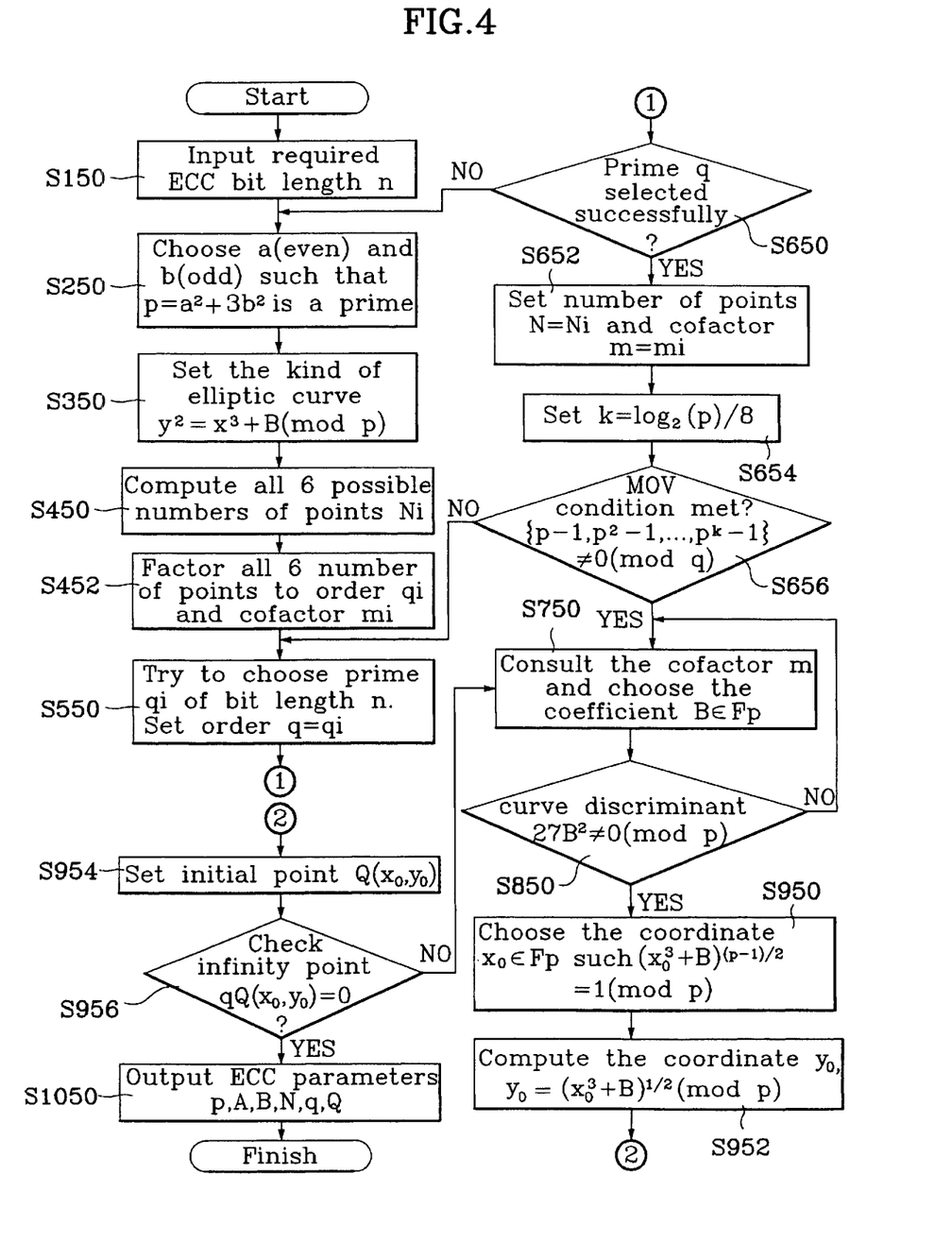
FIG. 4 is a flowchart for constructing elliptic curve cryptosystems according to an embodiment of the present invention when CM discriminant value is 3.

The process for generating an elliptic curve cryptosystem with the second type of elliptic curve, $y^2=x^3+B$ (mod p), where p=1 (mod 6), with be explained with reference to FIG. 4. First, a prime p having a length of one or two bits higher than the required order is chosen (step S150) such that p=1 (mod 6), and the decomposition of $p=a^2+3b^2$, where a≠0 (mod 3) and where one of a or b is even while the other is odd, is found (step S250). For p=1 (mod 6), a decomposition always exists, as shown in Theorem 1 and Corollary 2. Alternatively in step S250, p may be reconstructed by choosing a pair of random integers a, b satisfying the above conditions such that the integer $p=a^2+3b^2$ is a prime of the required length (here, the condition p=1 (mod 6) always holds).

Next, the kind of elliptic curve equation: $y^2=x^3+B$ (mod p) is determined with a CM discriminant value of 3 (step S350). There are six possible number of points on such curve: $N_i=\{p+1\pm 2a, p+1\pm(a\pm 3b)\}$. The actual number of points depends upon coefficient B. The six possible number of points are computed (step S450), resulting in the following variants:

$N_1=p+1+(a+3b)$;

$N_2=p+1+(a-3b)$;

$N_3=p+1-(a+3b)$;

$N_4=p+1-(a-3b)$;

$N_5=p+1+2a$;

$N_6=p+1-2a$.

Thereafter, the prime divisors $q_i$ for all four computed variants are computed by $N_i=m_i \cdot q_i$, where the possible values of m are 1, 3, 4 or 6 (step S452).

$N_1=m_1 \cdot q_1$;

$N_2=m_2 \cdot q_2$;

$N_3=m_3 \cdot q_3$;

$N_4=m_4 \cdot q_4$;

$N_5=m_5 \cdot q_5$;

$N_6=m_6 \cdot q_6$.

The variant of a prime divisor q, having the required order and the corresponding number of points N, is chosen (step S550). In general, q is a few bits shorter than p. By choosing the initial p one or two bits longer than the order required, the possibility to select q of the exact length required is provided. The MOV conditions and the relative primality of N and p are checked for the selected N and p (steps S650–S656). If q has not been appropriately selected or if there are no suitable q and N, the process returns to step S550. Also, if any one of the other conditions does not hold, the process returns to step S550 and another q and N are chosen.

If all conditions are satisfied, a coefficient B is chosen (step S750) such that:

(i) if N=1 (mod 6) and if order cofactor m is equal to 1, B should be both the quadratic and cubic non-residue satisfying the modular inequalities $B^{(p-1)/2} \neq 1$ (mod p) and $B^{(p-1)/3} \neq 1$ (mod p);

if N=3 (mod 6) and if order cofactor m is equal to 3, B should the quadratic non-residue and cubic residue satisfying the equation $B^{(p-1)/2}=-1$ (mod p) and $B^{(p-1)/3}=1$ (mod p);

if N=4 (mod 6) and if order cofactor m is equal to 4, B should be the quadratic residue and cubic non-residue satisfying the equations $B^{(p-1)/2}=1$ (mod p) and $B^{(p-1)/3} \neq 1$ (mod p);

if N=0 (mod 6) and if order cofactor m is equal to 6, B should be both the quadratic and cubic residue satisfying the equation $B^{(p-1)/6}=1$ (mod p); and (ii) for chosen B, A=0 and a check is made whether the elliptic curve has a non-zero discriminant (step S850): $4 \cdot A^3+27 \cdot B^2 \neq 0$ (mod p).

The elliptic curve constructed by steps S250–S750 should have a non-zero discriminant, unless a computation error has been made. If the discriminant is not equal to zero, the process returns to step S750. The initial point $Q(x_0, y_0)$, satisfying the elliptic curve equation is chosen (steps S950 to S954), checking that being multiplied by order q produces an infinity point: $q \cdot Q=O$ (step S956). If such condition does not hold, the process also returns to step S750 and choose another coefficient B.

Alternatively, an $x_0$ coordinate may be chosen, checking the condition $(x_0^3+B \; x_0)^{(p-1)/2}=1$ (mod p) and if such condition holds, the $y_0$ coordinate of an initial point may be computed by solving the elliptic curve equation. If $y_0$ does not satisfy the condition, the process returns to step S750 and another equation coefficient B is chosen. At this point, the Elliptic curve cryptosystem has been generated and the new elliptic curve cryptosystem parameters: p, A, B, N, q, Q are output (S1050). An example will be given to illustrate the process of generating an elliptic curve cryptosystem.

EXAMPLE 2

Let p=43. A factorization of p produces a=4 and b=3, since $4^2+3 \cdot 3^2=43$. The possible numbers of points and corresponding orders of subgroups are:

$N_1=p+1+(a+3b)=57=3 \cdot 19$; (a prime)

$N_2=p+1-(a-3b)=39=3 \cdot 13$; (a prime)

$N_3=p+1-(a+3b)=31=1 \cdot 31$; (a prime as well as maximal)

$N_4=p+1-(a-3b)=49=1 \cdot 49$; (not a prime, not considered later)

$N_5=p+1+2a=52=4 \cdot 13$; (a prime)

$N_6=p+1-2a=36=6 \cdot 6$; (not a prime, not considered later).

Accordingly, as a first approximation, the best choice would be to designate N=31, q=31 and cofactor m=1. Checking the security conditions, N and p are relatively prime; N≠p+1; and the MOV condition (p−1=42→11≠0 (mod q) and $p^2$1=1849→20≠0 (mod q); for this short p, it is enough) also holds. Thus, the selected parameters may be used to generate a curve.

To choose the required curve coefficient B, m must be considered. Since m is equal to 2, B should be both the quadratic and cubic non-residue modulo p where $B^{(p-1)/2}=-1$ (mod p) and $B^{(p-1)/3}=-1$ (mod p). First, a value is tried for B, for example B=2. Computing $B^{21}=2097152 \to -1$ (mod p), but $B^{14}=16384 \to 1$ (mod p). This B is not a quadratic non-residue modulo p. Setting B=3, $B^{21}=$ 10460353203→−1 (mod p) and $B^{14} \neq 1$ (mod p). Thus, the coefficient B is selected to have a value of 3. Next, the elliptic curve discriminant is checked for B=3, where $4B^2=$ 243→28≠0 (mod p). The elliptic curve equation is $y^2=x^3+3$ (mod p).

To choose the initial point $Q(x_0, y_0)$ on the curve, $x_0$ will first be chosen and determined whether it makes the right part of the curve equation into quadratic residue. Trying $x_0=2$, $(x_0^3+B)^{(p-1)/2}=11^{21} \to 1$ (mod p) and the equation is solvable, producing $y_0=22$. Hence, a group generator $Q(x_0, y_0)=Q(2, 22)$. Checking the point order, the scalar multiplication $q \cdot Q$ should produce an infinity point, while $m \cdot Q$ should not. $31Q=O$ and $1Q \neq O$. Thus, all the parameters were computed properly and the selected point is a group generator. The parameters p=43, A=0, B=3, N=31, q=31, $Q(x_0, y_0)=Q(2, 22)$ are output.

Note that the above example is for illustrative purposes only. To provide the proper security level, a q length of hundreds bits is often required depending upon the practical system application. Because of a close correlation between p and q length, p should be chosen (or constructed) such that it will have a length of hundreds bits too.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method used in constructing an elliptic curve cryptosystem with an underlying field Fp of characteristic p, the method using a computer system and comprising the steps of:

(a) selecting a predetermined value of CM discriminant D;

(b) constructing a prime p such that a decomposition of $p=a^2+Db^2$, where the values of a and b are integers;

(c) generating an elliptic curve utilizing said CM discriminant D, said elliptic curve having the equation $y^2=x^3+Ax+B$ where A and B are integers;

(d) computing possible numbers of points $N_i$ on said elliptic curve;

(e) computing maximal prime divisors $q_i$ for the computed numbers of points $N_i$;

(f) selecting a maximum value from the computed prime divisors $q_i$ which satisfies predetermined security requirements as an elliptic curve order q and selecting the corresponding N number of points;

(g) selecting coefficients A and B for said elliptic curve equation such that the elliptic curve has N number of points and elliptic curve order of q;

(h) determining whether the elliptic curve has a non-zero discriminant;

(i) selecting a point Q on said elliptic curve as an initial group generator if the elliptic curve is determined to have a non-zero discriminant in step (h) such that the order of the point Q equals the elliptic curve order q; and (j) outputting parameters p, A, B, N, q, and Q to construct the elliptic curve cryptosystem.

2. A method of claim 1, wherein said step (i) further comprises the step of checking whether a multiplication of the selected point Q and the order q produces an infinity point.

3. A method of claim 1, wherein said step (b), a prime p having a length of one or two bits higher than the required order is constructed.

4. A method of claim 1, wherein in said step (f), the predetermined security requirements are satisfied if the number of points N is relatively prime to prime p;

the order q does not equal to prime p; and the order q does not divide any number from the set $\{p-1, p^2-1, \ldots, p^{k-1}\}$. Where $k \approx \log_2(p)/8$.

5. A method of claim 1, wherein said prime $p=1$ (mod 4); the value of said CM discriminant D is 1; and in said step (g), selecting coefficients A and B such that said elliptic curve equation is $y^2=x^3+Ax$, where $A \neq 0$.

6. A method of claim 5, wherein in said step (b), the prime p is constructed by first selecting values of a and b.

7. A method of claim 6, wherein in said step (b), the values of a and b are selected such that a and b have different parity and such that the prime p has a length of one or two bits higher than the required order.

8. A method of claim 5, wherein said step (g) further comprises the step of selecting coefficient A such that $4A^3 \neq 0$.

9. A method of claim 5, wherein in said step (e), the primal divisors are computed by an equation $N=m \cdot q$, where $m=2$ or $m=4$.

10. A method of claim 9, wherein in said step (g), the coefficient A is chosen such that if $N=0$ (mod 4) and if an order cofactor m is equal to 4, the coefficient A should be the quadratic residue satisfying the modular equation $A^{(p-1)/2}=1$ (mod p), and if $N=2$ (mod 4) and if an order cofactor m is equal to 2, the coefficient A should be the quadratic non-residue satisfying the modular equation $A^{(p-1)/2}=-1$ (mod p).

11. A method of claim 5, wherein in said step (d), the possible numbers of points on said elliptic curve are $p+1\pm 2b$.

12. A method of claim 5, wherein in said step (b), the prime p is constructed such that the values a and b have different parity and wherein $a \neq 0$ (mod 3).

13. A method of claim 1, wherein said prime $p=1$ (mod 6); the value of said CM discriminant D is 3; and in said step (g), selecting coefficients A and B such that said elliptic curve equation is $y^2=x^3+B$.

14. A method of claim 13, wherein in said step (b), the prime p is constructed by first selecting the values of a and b.

15. A method of claim 14, wherein in said step (b), $a \neq 0$ (mod 3).

16. A method of claim 13, wherein said step (g) further comprising the step of selecting coefficient B such that $27B^2 \neq 0$.

17. A method of claim 13, wherein in said step (e), the maximal prime divisors are computed by an equation $N=m \cdot q$, where m may be one of the values 1, 3, 4, or 6.

18. A method of claim 13, where in said step (d), the possible numbers of points on said elliptic curve are $p+1\pm 2a$ or $p+1\pm(a\pm 3b)$.

19. A method used in constructing an elliptic curve cryptosystem with an underlying field Fp of characteristic p, the method using a computer system and comprising the steps of:

(a) selecting a value of a CM discriminant D to be equal to 3;

(b) constructing a prime p such that a decomposition of $p=a^2+Db^2$, where the values of a and b are integers, wherein said prime $p=1$ (mod 6);

(c) generating an elliptic curve utilizing said CM discriminant D, said elliptic curve having the equation $y^2=x^3+Ax+B$ where A and B are integers;

(d) computing possible numbers of points $N_i$ on said elliptic curve;

(e) computing maximal prime divisors $q_i$ for the computed numbers of points $N_i$, wherein the maximal prime divisors are computed by an equation $N=m \cdot q$, where m may be one of the values 1, 3, 4, or 6;

(f) selecting a maximum value from the computed prime divisors $q_i$ which satisfies predetermined security requirements as an elliptic curve order q and selecting the corresponding N number of points;

(g) selecting coefficients A and B for said elliptic curve equation such that the elliptic curve has N number of points and elliptic curve order of q and said elliptic curve equation is $y^2=x^3+B$, wherein the coefficient B is chosen such that if $N=1$ (mod 6) and if an order cofactor m is equal to 1, B is both the quadratic and cubic non-residue satisfying the modular inequalities $B^{(p-1)/2} \neq 1$ (mod p) and $B^{(p-1)/3} \neq 1$ (mod p);

if $N=3$ (mod 6) and if an order cofactor m is equal to 3, B is the quadratic non-residue and cubic residue satisfying the equation $B^{(p-1)/2}=-1$ (mod p) and $B^{(p-1)/3}=1$ (mod p);

if N=4 (mod 6) and if an order cofactor m is equal to 4, B is the quadratic residue and cubic non-residue satisfying the equations $B^{(p-1)/2}=1$ (mod p) and $B^{(p-1)/3}\neq 1$ (mod p); and if N=0 (mod 6) and if an order cofactor m is equal to 6, B is both the quadratic and cubic residue satisfying the equation $B^{(p-1)/6}=1$ (mod p);

(h) selecting a point Q on said elliptic curve as an initial group generator such that the order of the point Q equals the elliptic curve order q; and (i) outputting parameters p, A, B, N, q, and Q to construct the elliptic curve cryptosystem.

20. A method used in constructing an elliptic curve cryptosystem with an underlying field Fp of characteristic p, the method using a computer system and comprising the steps of:

selecting a value of 1 as a CM discriminant D;

selecting integers a and b having different parity;

constructing a prime p having a length of one or two bits higher than the required order and having a decomposition of p equal to $a^2+b^2$, where a and b are integers;

generating an elliptic curve utilizing said CM discriminant D, said elliptic curve having the equation $y^2=x^3+Ax+B$ where A∈Fp and B=0;

computing possible numbers of points on said elliptic curve;

computing maximal prime divisors for the computed variant of said possible numbers of points;

selecting a maximum value of from the computed prime divisors which satisfies predetermined security requirements as an elliptic curve order q and selecting the corresponding N number of points;

selecting coefficient A for said elliptic curve equation such that the elliptic curve has N number of points and order q, wherein $4A^3\neq 0$;

determining whether the elliptic curve has a non-zero discriminant;

selecting a point Q on said elliptic curve as an initial group generator if the elliptic curve is determined to have a non-zero discriminant such that the order of the point Q equals the elliptic curve order q; and outputting parameters p, A, B, N, q, and Q to construct the elliptic curve cryptosystem.

21. A method used in constructing an elliptic curve cryptosystem with an underlying field Fp of characteristic p, the method using a computer system and comprising the steps of:

selecting a value of 3 as a CM discriminant D;

selecting integers a and b;

constructing a prime p having a length of one or two bits higher than the required order and having a decomposition of p equal to $a^2+3b^2$, where a and b are integers;

generating an elliptic curve utilizing said CM discriminant D, said elliptic curve having the equation $y^2=x^3+Ax+B$ where B is an integer and A=0;

computing possible numbers of points on said elliptic curve;

computing maximal prime divisors for the computed variant of said possible numbers of points;

selecting a maximum value of from the computed prime divisors which satisfies predetermined security requirements as an elliptic curve order q and selecting the corresponding N number of points;

selecting coefficient B for said elliptic curve equation such that the elliptic curve has N number of points and order of q, wherein $27B^2\neq 0$;

determining whether the elliptic curve has a non-zero discriminant;

selecting a point Q on said elliptic curve as an initial group generator if the elliptic curve is determined to have a non-zero discriminant such that the order of the point Q equals the elliptic curve order q; and outputting parameters p, A, B, N, q, and Q to construct the elliptic curve cryptosystem.

\* \* \* \* \*